UNITED STATES PATENT OFFICE.

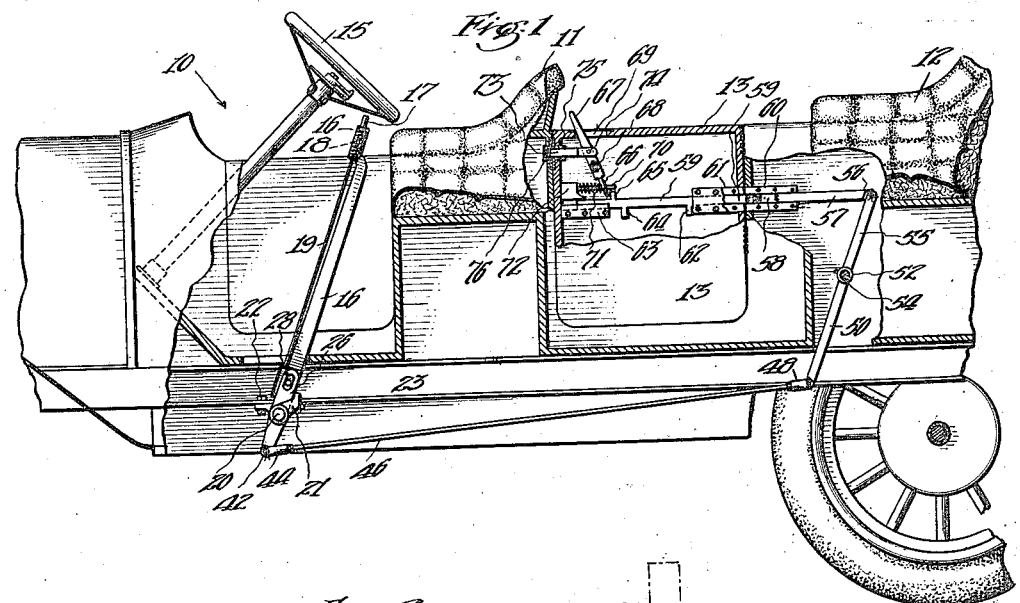
Y. KARIYA.
AUTOMOBILE DOOR MECHANISM.
APPLICATION FILED SEPT. 10, 1913.
1,138,117.
Patented May 4, 1915.
2 SHEETS—SHEET 1.

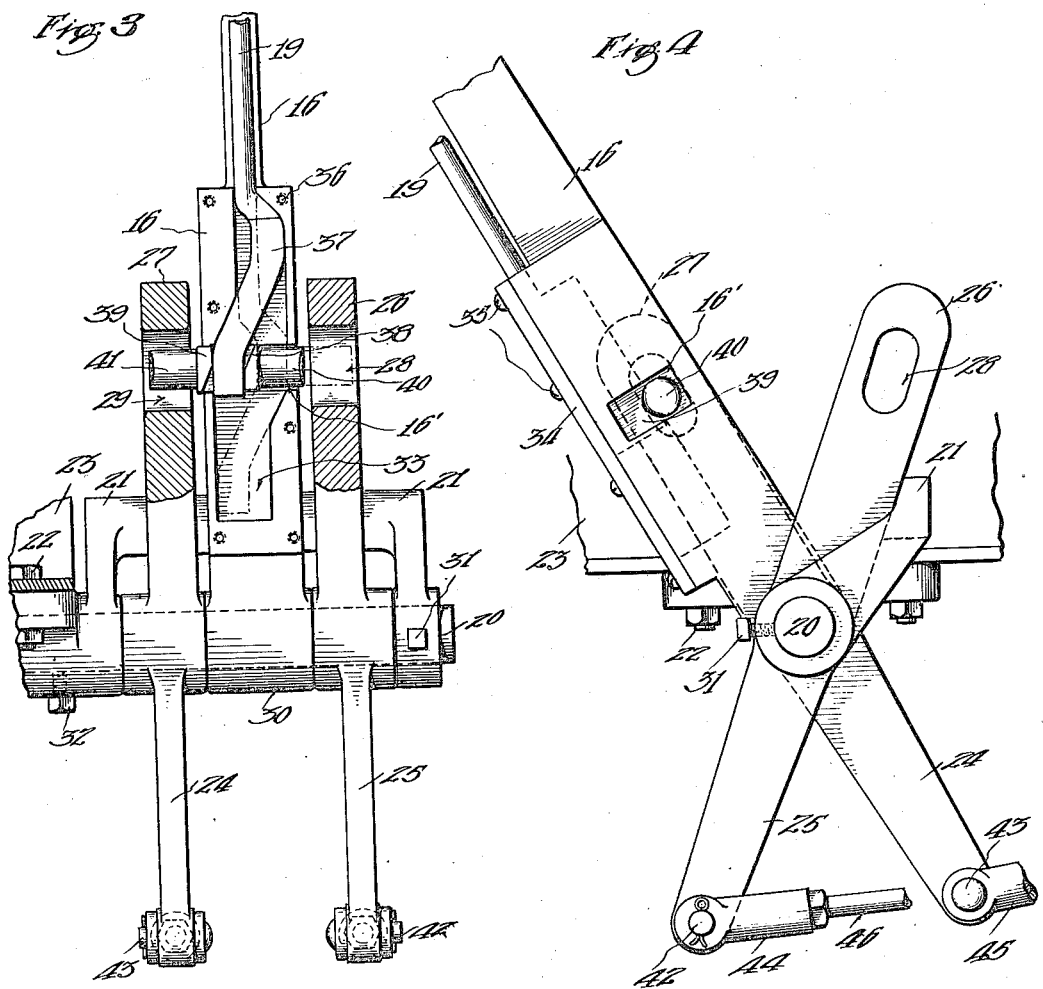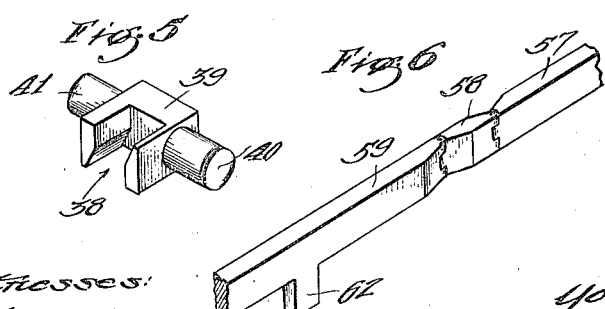

YOSHIHEI KARIYA, OF LOS ANGELES, CALIFORNIA.

AUTOMOBILE DOOR MECHANISM.

1,138,117.  Specification of Letters Patent.  Patented May 4, 1915.

Application filed September 10, 1913.  Serial No. 789,198.

*To all whom it may concern:*

Be it known that I, YOSHIHEI KARIYA, a citizen of the United States, residing at Los Angeles, in the county of Los Angeles and State of California, have invented a new and useful Automobile Door Mechanism, of which the following is a specification.

My invention relates to actuating mechanisms for automobile or similar vehicle doors.

The principal object of my invention is to provide means whereby the driver of the automobile may unlatch either of the rear side doors of such an automobile by means of a single lever located beside the driver's seat.

A further object of my invention is to provide means whereby by using a single handle either or both of the doors may be unlatched, and opened, or closed and latched.

Further objects and advantages will appear hereinafter.

Referring to the drawings which are for illustrative purposes only; Figure 1 is a side elevation, partly in section of an automobile to which my invention has been applied. Fig. 2 is a plan partly in section of this embodiment of my invention. Fig. 3 is a front view partly in section of the selective means upon the operating lever. Fig. 4 is a side view of the same means. Fig. 5 is a perspective view of a portion of this means. Fig. 6 is a perspective view of the link mechanism operating the door.

In the embodiment of my invention illustrated in the drawings, 10 is an automobile having a front seat 11 and a rear seat 12. Access is given to the rear seat 12 of the automobile through two doors, one 13 on the right hand side and one 14 on the left hand side. The driver commonly sits at the right hand side of the forward seat and steers the automobile by means of the steering wheel 15, controlling its movements by the usual gears and clutches, as is standard practice in such vehicles.

The principal object of my invention is to provide a lever 16 which may be operated from this forward seat to unlatch and open and close either or both of the doors 13 and 14. This lever 16 is provided with a button 17 on the top thereof, upon which the operator may press his thumb, this button being held in its upward position by means of a spring 18. The button 17 is also connected to a push rod 19 which extends downwardly and serves to actuate the selective mechanism shown very plainly in Figs. 3 and 4. This selective mechanism is mounted upon a shaft 20 secured in a bearing bracket 21 by set screws 31 and 32, the bearing bracket 21 being secured by any suitable means such as a bolt 22 to a portion of the frame 23 of the automobile. Mounted loosely on this shaft are two levers 24 and 25. These levers are provided with upwardly projecting portions 26 and 27 having slots 28 and 29 therein. The lever 16 has a bearing 30 at the lower end thereof, this bearing turning freely on the shaft 20. The lever 16 has an opening 33 formed therein, this opening being normally closed by a cover 34 secured in place by means of screws 35 secured in the holes 36.

The cover 34 is shown removed in Fig. 3, for the purpose of showing a cam 37 which is formed on the lower end of the rod 19. This cam has the peculiar form illustrated in Fig. 3 and is adapted to slide through a slot 38 in a bolt member 39. Openings 16' are provided in the sides of the lever 16 through which this bolt projects, the bolt being so located that when the levers 16 and 26 are in proper angular relation bolts 40 and 41 formed on the bolt member 39 may be forced into the slots 28 and 29.

The levers 24 and 25 extend in a downward direction and are provided with pins 42 and 43 upon which are pivotally secured lever ends 44 and 45. These lever ends have adjustably secured therein push rods 46 and 47. The rods 46 and 47 extend under the floor of the automobile to similar lever ends 48 and 49 which are pivotally attached to the lower ends 50 and 51 of the levers 52 and 53. The lever 53 is loose upon a shaft 54 and the lever 52 is rigidly secured upon this shaft 54. Lever 53 has an upwardly extending arm 55 which is pivotally secured at the point 56 to a link 57. The link 57 is pivotally secured, as is plainly shown in Fig. 6, to a link 58 which is in turn pivotally secured to a link 59. Links 57 and 58 slide through a housing 60 secured in the body of the automobile, as is plainly shown in Fig. 2, and one end of the link 59 slides in the housing 61 secured in the door of the automobile. A projection 62 is provided on the link 59 to limit the movement thereof in one direction by striking upon the housing 61. The other end of the link 59 slides in a housing 63, and the link 59 is provided with a projection 64 which is adapted to limit the opposite movement thereof by striking upon the housing 63. The link 59 is also provided with a projection 65 which extends upwardly and strikes upon an end 66 of a hand lever 67 which is pivoted at a point 68. The lever 67 extends through an opening 69 in the top of the door and may be operated by hand, as is the usual manner in such devices as commonly applied to automobiles. The lower end 66 of the lever 67 has an opening therein, through which passes a pin 70 upon which is placed a coil spring 71, this pin 70 being secured in a block 72 secured in the door body and against which the spring 71 body presses. A latch 73 is provided, pivotally secured to the lever 67 by means of a pin 74. This latch 73 slides in a housing 75 secured in the door body and projects therefrom a sufficient distance to enter the socket 76 which is formed in the automobile body.

As has been explained, the rod 46 is secured by means of the rod end 48 to the lower end 50 of a lever 52 which is rigidly fastened to the shaft 54. This shaft 54 is mounted in bearings 85 and 86 on either side of the automobile and turns freely therein. As has been explained, the lever 53 turns freely upon this shaft, and the lever 52 is rigidly secured thereon. A lever 77 is also rigidly secured on this shaft and corresponds in its location and operation with the lever 55 which has previously been referred to. This lever 77 is pivoted by means of the pin 79 to a link 80 which is exactly similar to and has a similar function to the link 57 previously referred to. The door 14 has a similar structure to the door 13 and contains parts exactly similar to the parts 58 to 74 inclusive, which have previously been explained. A lever 81, corresponding to the lever 67, is provided projecting through an opening 82 in the top of the door.

The method of operation of my invention is as follows: The shape of the cam 37 is such that when it is in its upward position, as shown in Fig. 3, in which position it is normally held by means of the spring 18, the bolt 41 is forced over into the slot 29. The lever 27 and the lever 16 therefore move together and as the lever 16 is actuated the lever 27 is actuated and the rod 47 is moved back and forth. As the rod 47 is moved to the right, as shown in Figs. 1, 2 and 4, it rotates the lever 53 about the shaft 54 in a counter clock-wise direction, as shown in Fig. 1. This rotation forces the link 57 to the left, as shown in that figure, and this movement is transmitted through the link 58 and the link 59. The initial movement of the link 59 causes the projection 65 to strike against the end 66 of the lever 67 and rotates this lever against the action of the spring 71 about the pin 68. This rotation draws the latch 73 to the right and pulls it out of the socket 76, thus releasing this latch. A slight additional movement causes the projection 64 to strike against the housing 63 and the door is swung outwardly on hinges 83, due to the pressure upon the end of the link 59, this link having come to a firm bearing upon the housing 63, due to the projection 64 having struck thereon. A further movement of the lever 16 tends to swing this door farther open. When it is desired to close the door, the lever 16 is moved in a reverse direction, pulling upon the rod 47 and rotating the lever 52 in a clock-wise direction about the shaft 54, as is shown in Fig. 1. This pulls upon the links 57, 58 and 59 which move freely until the projection 62 strikes upon the housing 61. A further movement of the lever 16 tends to close the door, due to the pull upon the link 59 through the links 57 and 58. The initial movement of the link 59 releases the lower end 66 of the lever 67, and this lever is pushed by means of the spring 71 into the position shown in Fig. 1. As the door is closed, this latch snaps into place, being formed with a beveled face 84 for that purpose.

If it is desired to operate the door 14, the button 17 is pushed downwardly against the action of the spring 18, this forcing the rod 19 downwardly and forcing the cam 37 downwardly. This downward movement of the cam 37 moves the bolt 41 out of engagement with the hole 29 and forces the bolt 40 into engagement with the hole 28. Any angular movement of the lever 16 is then transmitted directly to the lever 26 and is transmitted downwardly through the lever 25 to the rod 46. This motion is transmitted from the rod 46 by means of the rod end 48 to the lever 52. This movement of the lever 52 rotates the shaft 54 which in turn actuates the lever 77, causing this lever to push or pull upon the link 80 and to actuate the door 14 in an exactly similar manner to the actuation of the door 13, as already explained.

It is evident that a movement of the lever 16, without pressing upon the button 17, will cause the door 13 to open and close, this being the door most largely used, especially in cities where access is generally desired to the sidewalk when the machine is on the right-hand side of the street. It is further evident from the foregoing explanation that by pressing down fully upon the button 17 the door 14 can be opened and closed, leaving the door 13 in either an open or closed position. It should be further evident that by pushing down slightly upon the button 17 that the bolt 39 may be made to assume an intermediate position in which it operates both of the levers 26 and 27 and may be utilized to open or close both doors.

What I claim is:

1. A mechanism for a swinging door comprising a latch adapted to enter a cavity in the door casing, a spring for holding said latch in said cavity, and a link sliding longitudinally in said door and having one projection so placed as to release said latch and having a second projection so placed as to strike upon and swing said door open.

2. A mechanism for a swinging door comprising a latch adapted to enter a cavity in the door casing, a lever for manually actuating said latch, a spring for holding said latch in said cavity, and a link sliding longitudinally in said door and having one projection so placed as to release said latch and having a second projection so placed as to strike upon and swing said door open.

3. In a vehicle having a front and a rear seat, doors giving access to said rear seat, a latch in each door, a lever for actuating each latch, a spring for holding each of said latches in the engaged position, a link system adapted to release said latch moving in said door, a shaft located transversely of the automobile under the rear seat, a door actuating lever turning freely on said shaft and actuating one of said link systems, a second door actuating lever rigidly secured to said shaft, a shaft actuating lever secured to said shaft, two pull rods, one secured to said first-named door actuating lever and the other secured to said shaft actuating lever, a short shaft located below and forward of the front seat, rod levers turning on said short shaft and connected to said pull rods, an operating lever and means whereby said operating lever may be connected to either or both of said rod levers.

4. A door formed of two parallel walls forming a narrow inclosed space therebetween, a doorway formed of two walls having a narrow inclosed space therebetween, a latch on said door, a link sliding between the walls of said door and having one projection for actuating said latch, a second projection engaging said door to close same, and a third projection engaging said door to open same, and means for actuating said link.

5. A door formed of two parallel walls forming a narrow inclosed space therebetween, a doorway formed of two walls having a narrow inclosed space therebetween, a latch on said door, a link sliding between the walls of said door and having one projection for actuating said latch, a second projection engaging said door to close same, and a third projection engaging said door to open same, a link sliding between the walls of said doorway, means for actuating said link, and means for connecting said links.

6. A door mechanism comprising a latch, a spring to hold said latch in the engaged position, a link having one projection for actuating said latch, a second projection for opening the door and a third projection for closing the door, and means for actuating said link.

In testimony whereof, I have hereunto set my hand at Los Angeles, California, this 3rd day of September, 1913.

YOSHIHEI KARIYA.

In presence of:
 FRED A. MANSFIELD,
 FORD W. HARRIS.